Jan. 10, 1967 M. G. HOOTEN 3,297,833
REPEATER FAULT LOCATION
Filed Oct. 21, 1963
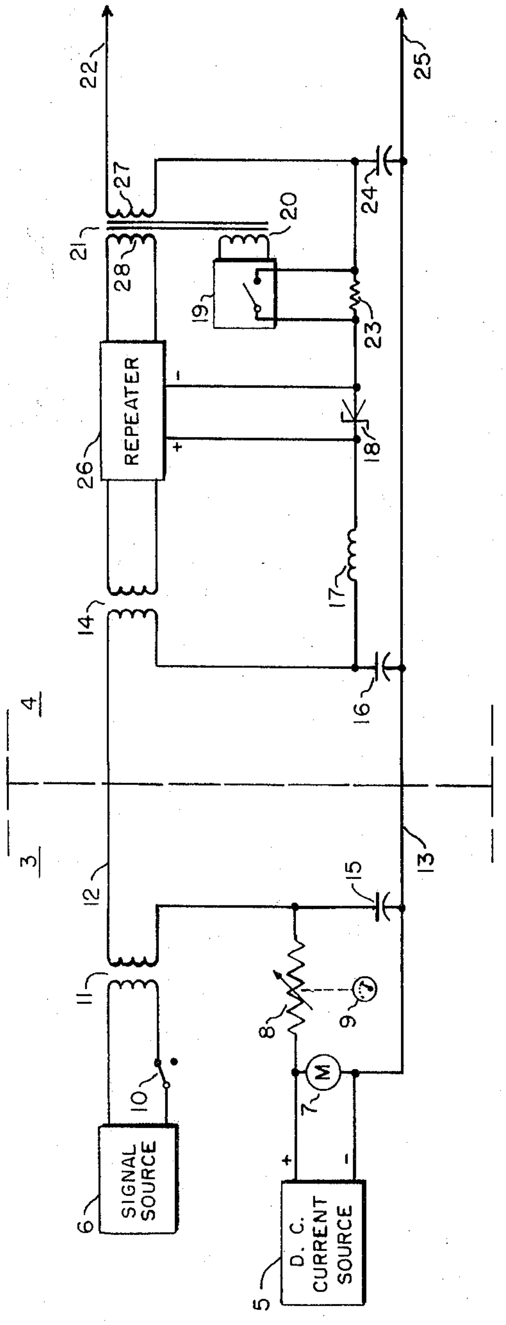
INVENTOR,
MERLE G. HOOTEN.
BY Harry M. Saragovitz,
Edward J. Kelly,
Herbert Berl &
Julian C. Keppler
ATTORNEYS 3,297,833
REPEATER FAULT LOCATION

Merle G. Hooten, Oceanport, N.J., assignor to the United States of America as represented by the Secretary of the Army Filed Oct. 21, 1963, Ser. No. 317,847
8 Claims. (Cl. 179—175.31)

The invention described herein may be manufactured and used by or for the Government for governmental purposes without the payment of any royalty thereon.

The present invention relates to the location of faulty or inoperative repeaters in a wire communication system and more particularly to a novel means and method of locating a faulty repeater in a system which includes a plurality of unattended repeaters.

It is an object of this invention to provide a method and means by which the location of an inoperative unattended repeater may be quickly and accurately pinpointed by measurements made at one of the attended terminals of the system.

It is a further object of the invention to provide simple and easily operated circuitry for accurately locating a defective repeater in a wire or cable communication system which includes a great many repeaters.

A further object of the invention is to provide a method and means for locating faulty unattended repeaters on a transmission line which includes a plurality of repeaters and in which the power for operating said repeaters is obtained over the same line or cable which carries the signal.

Other objects and advantages of the present invention will become apparent from the following detailed description and drawing, the sole figure of which is a circuit diagram which illustrates one embodiment of the invention.

The drawing illustrates one terminal 3 of a wire communication system and one of a plurality of repeating stations 4, spaced therealong. The illustrated system is one in which the direct current power for operating each of the repeaters is sent along the line or cable together with the alternating current signal which is amplified by each of the repeaters. At the attended terminal 3, the alternating current signal is applied to the line or cable 12–13 via transformer 11 from signal source 6. This signal may be a voice, video, pulse or digital signal which it is desired to transmit to the remote terminal of the system, not shown. The direct current power for operating all of the repeaters on the line is applied to the line 12–13 from constant current source 5. At the repeating station 4, the signal is applied to the input of repeater 26 via transformer 14. The direct current from source 5 flows through the primary of transformer 14, through choke 17, Zener diode 18, fault location resistor 23 of R ohms, the secondary 27 of transformer 21, line 22 and thence to the next repeater station in the system, not shown. In flowing through Zener diode 18 a fixed operating voltage equal to the breakdown voltage thereof is developed and applied to the repeater 26 to provide operating power therefor. The output of repeater 26 is applied to the primary 28 of transformer 21, the secondary 27 of which is connected across the line 22–25. Capacitors 15, 16 and 24 are signal by-pass capacitors and choke 17 prevents the oscillation or singing of the repeater by isolating its output from its input. Tertiary winding 20 of transformer 21 is connected to switch 19. When repeater 26 is operative, the output thereof will hold switch 19 in the closed position, thereby shorting fault location resistor 23. If any given repeater becomes inoperative, all of the succeeding repeaters will have neither inputs nor outputs and therefore all of the succeeding fault location resistors will be placed in series with the cable or wire D.C. circuit, together with the fault location resistor of the inoperative repeater. The switch 19 may take various forms, for example, the signal output of the repeater may be rectified and applied to a relay coil, the normally open contacts of which are connected across resistor 23, or the shorting of resistor 23 may be accomplished by means of a transistor, the collector-emitter circuit of which is arranged to short 23 in the presence of an output from repeater.

In accordance with the invention, the change in the D.C. resistance of the transmission line caused by the insertion therein of the fault location resistors is utilized to locate the faulty repeater. This is accomplished in the following manner. The variable resistor 8 is in series with the D.C. path of the transmission line at terminal 3. Under normal operating conditions, with all repeaters operative, the switch 10 is in the position shown and the resistor 8 is adjusted to zero ohms. In the event of failure of any repeater on the line, the signal source 6 is disconnected from the line by opening switch 10. This inserts all of the fault location resistors in series with the D.C. path of the line and raises the terminal voltage of constant current source 5. The terminal voltage of 5 is then noted on meter 7, which may be of the suppressed-zero type for greater reading accuracy. The signal is then reapplied to the line by closing switch 10. This results in the shorting of all of the fault location resistors of all of the repeaters on the line up to, but not including, the first inoperative one, and a lowering of the D.C. resistance of the line. The resistor 8 is then adjusted until the voltage reading of voltmeter 7 comes up to the same value which was previously noted with the signal disconnected. Under these conditions the setting or resistance of 8 equals the resistance of each fault location resistor (R) times the number of operative repeaters in the system. The number of operative repeaters can then be read on dial 9 which indicates the setting of variable resistor 8. The maximum value of 8 is made equal to the value of each fault location resistor times the total number of repeaters on the line. The dial 9 may be calibrated in units or steps of R ohms and thereby indicate directly the number of operative repeaters on the line. It should be noted that the accuracy of this method does not depend on the value of the current output of source 5, so long as this current does not vary between the two readings of voltmeter 7. In a prior art method of locating faulty repeaters in a system of this type, no variable resistor is included in the circuit and the terminal voltage of the constant current source is first measured with no signal applied and the meter set to zero. The signal is then applied to the line and causes the fault location resistor of each operative repeater to be shunted out of the D.C. path thereby lowering the terminal voltage. The voltmeter senses this voltage reduction and is calibrated to read directly in the number of operative repeaters. The difference in the two voltage readings is proportional to the resistance of each fault location resistor times the number of operative repeaters times the current output of the constant current source. The accuracy of the measurement therefore depends on the regulation of the current source with load variations as well as the accuracy of the fault location resistors and the voltmeter and therefore a complex, closely regulated current source and a high accuracy voltmeter is required in such a system. On the other hand, the accuracy of the presently described invention is independent of current source regulation and voltmeter accuracy. This prior art method and apparatus is disclosed in U.S. patent application 52,156, filed on August 26, 1960 by Gordon R. Partridge, now Patent 3,082,300.

The invention has been disclosed in connection with an illustrative embodiment, however many modifications thereto are possible without departing from the inventive concepts included herein, accordingly the invention should be limited only by the scope of the appended claims.

What is claimed is:

1. The method of locating a faulty repeater in a transmission line which includes a plurality of unattended repeaters and in which the direct current for operating all of said repeaters is sent over said line from a constant current source together with an alternating current signal and in which each operative repeater is arranged to short out a fault location resistor of R ohms in series with said line, comprising the steps of removing said signal from the input of said line, noting the terminal voltage of said constant current source, reapplying said signal to the input of said line, inserting a resistor in series with said line of sufficient resistance to reestablish said previously noted terminal voltage and dividing the resistance of said resistor by R to obtain the number of operative repeaters on said transmission line.

2. The method of determining the number of operative repeaters on a transmission line in which a source of constant direct current is sent over said line together with an alternating current signal and in which the output of each operative repeater is arranged to short out a fault location resistor of R ohms in series with said line, comprising the steps of determining the terminal voltage of said source of constant direct current with no signal applied to said line and determining the amount of resistance which must be inserted into said line with the signal applied to reestablish said terminal voltage, and dividing said amount of resistance by R to determine the number of operative repeaters.

3. The method of determining the number of operative unattended repeaters on a transmission line in which operating power for each repeater is sent over said line from a source of constant direct current from an attended terminal of said line together with an alternating current signal and in which the output of each operative repeater is arranged to short out a fault location resistor of R ohms in series with said line, comprising the steps of measuring the terminal voltage of said source of constant direct current with no signal applied to said line, applying said signal to said line, and measuring the amount of resistance which must be inserted in said line to reestablish said terminal voltage and dividing said amount of resistance by R to determine the number of operative repeaters.

4. A method of locating the last operative repeater on a transmission line which includes a plurality of unattended repeaters, the operating power for which is sent along said line from a source of constant direct current at one of the attended terminals of said line and wherein each operative repeater is arranged to short out a fault location resistor in series with said line, comprising the steps of noting the terminal voltage of said source of constant direct current with no signal applied to said line and determining the amount of resistance which must be inserted into said line with the signal applied to reestablish said previously noted terminal voltage, and dividing said amount of resistance by the resistance of each fault location resistor to determine the number of operative repeaters on said line.

5. Apparatus for locating a faulty repeater on a transmission line which includes a plurality of repeater stations, the operating power for which is sent over said line from a source of constant direct current at an attended terminal of said line together with an alternating current signal which is amplified by each of said repeaters and each repeater station having means to short out a fault location resistor of R ohms in series with said line at each repeater station in response to the alternating current output of each repeater, comprising, a suppressed-zero voltmeter connected across the terminals of said source of constant direct curernt, a variable resistor connected in series with said line at said attended terminal, said variable resistor having a maximum restance of $n$ times R ohms where $n$ is the number of repeaters on said line, a dial connected to said variable resistor, said dial being calibrated in units of R ohms, whereby said dial indicates the number of operative repeaters on said line, and means to disconnect said alternating current signal from said line.

6. Apparatus for determining the number of operative repeaters on a transmission line which includes a plurality of repeaters, the operating power for which is sent over said line from a source of constant direct current at an attended terminal of said line together with an alternating current signal which is amplified by each repeater, and the alternating current output of each repeater being arranged to close a switch which shorts out a fault location resistor of R ohms in series with said line, comprising a voltmeter connected across the terminals of said source of constant current, a variable resistor in series with said line, said resistor being calibrated in steps of R ohms, and means at said attended terminal to disconnect said alternating current signal from said line.

7. Apparatus for determining the number of operative repeaters on a transmission line which includes a plurality of repeaters, the operating power for which is sent over said line from a source of constant direct current at an attended terminal of said line together with an alternating current signal which is amplified by each of said repeaters and further includes impedance means in series with said line at each repeater for developing operating power therefor and means controlled by the presence of an output from each repeater to short out a fault location resistor of R ohms in series with said line, said apparatus comprising, a voltmeter connected across the terminals of said source of constant current, a variable resistor in series with said line at said attended terminal, said variable resistor being calibrated in steps of R ohms, and means at said attended terminal to disconnect said alternating current signal from said line.

8. In a wire or cable transmission system comprising a transmission line with a plurality of unattended repeaters spaced therealong and in which operating power for said repeaters is sent over said line from a source of constant direct current at an attended terminal of said line together with an alternating current signal and in which the output of each repeater is arranged to actuate a switch which shorts out a fault location of R ohms in series with said line at each repeater; the improvement comprising, a voltmeter connected across the terminals of said source of constant direct current, a variable resistor connected in series with said line at said attended terminal, said variable resistor being calibrated in units of R ohms and having a maximum resistance of $n$ times R ohms, where $n$ is the number of repeaters along said line, and means to disconnect said alternating current signal from said line.

References Cited by the Examiner

UNITED STATES PATENTS 3,082,300 3/1963 Partridge ---------- 179—175.31

KATHLEEN H. CLAFFY, *Primary Examiner.*

S. J. BOR, R. MURRAY, *Assistant Examiners.*